June 7, 1938.  J. S. MILLER ET AL  2,119,823
METHOD AND MEANS FOR USE IN DENTISTRY
Filed March 3, 1934  2 Sheets-Sheet 1
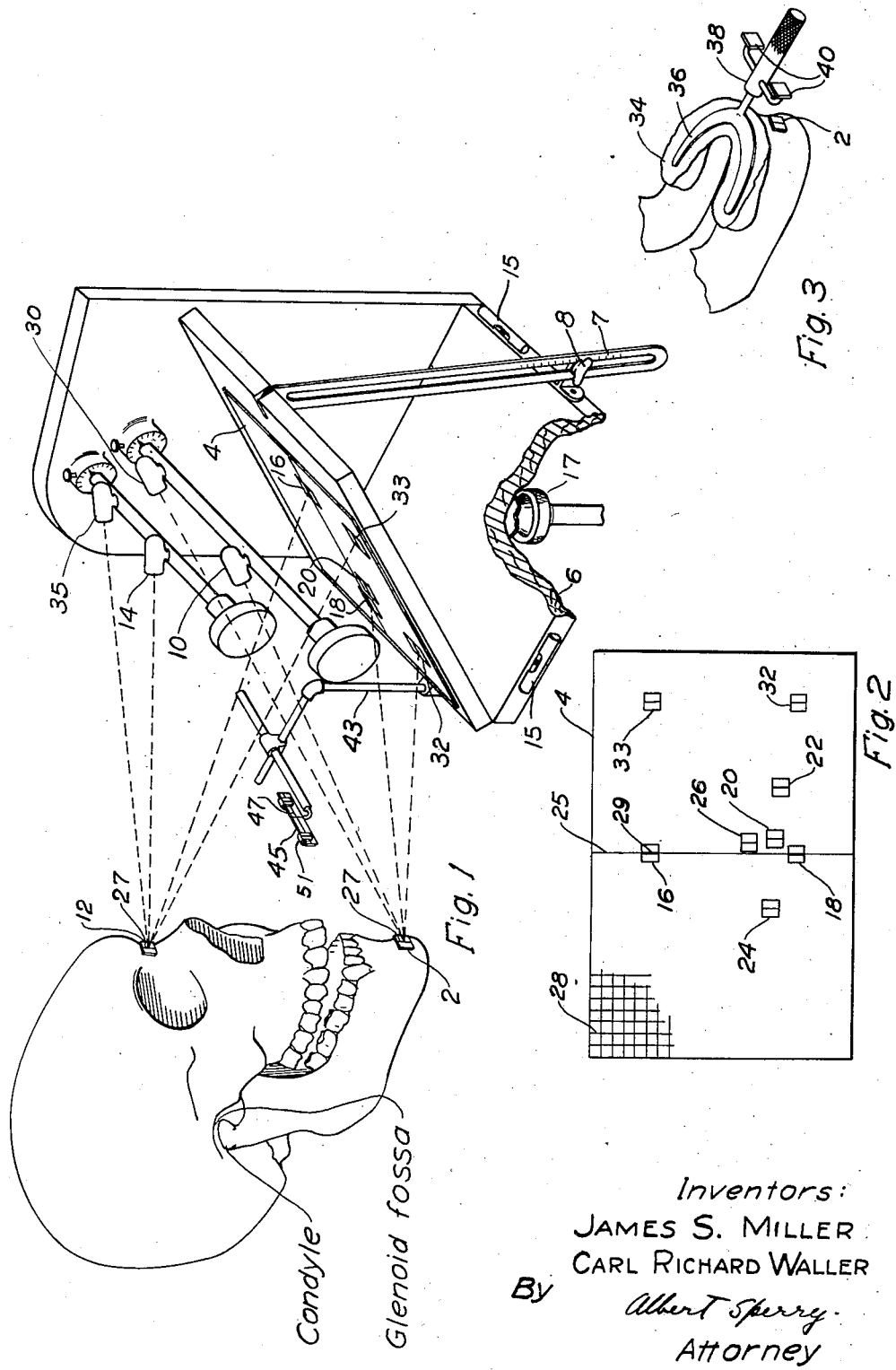
Inventors:
JAMES S. MILLER
CARL RICHARD WALLER
By Albert T Sperry
Attorney June 7, 1938.                J. S. MILLER ET AL                2,119,823
                    METHOD AND MEANS FOR USE IN DENTISTRY
                         Filed March 3, 1934           2 Sheets-Sheet 2
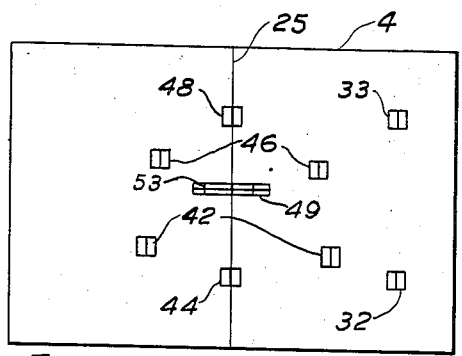
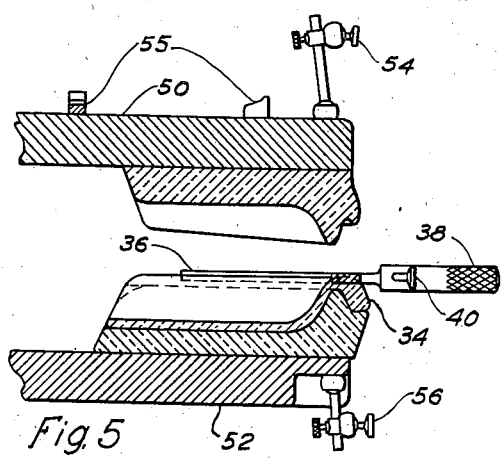
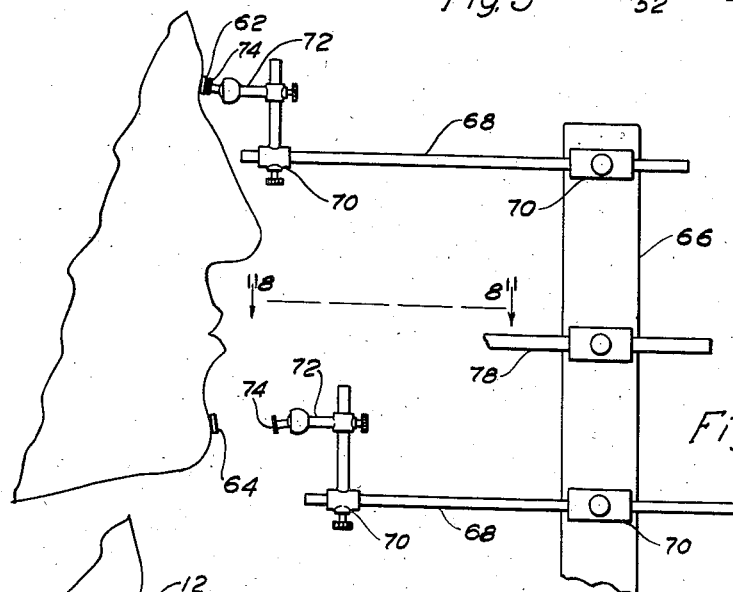
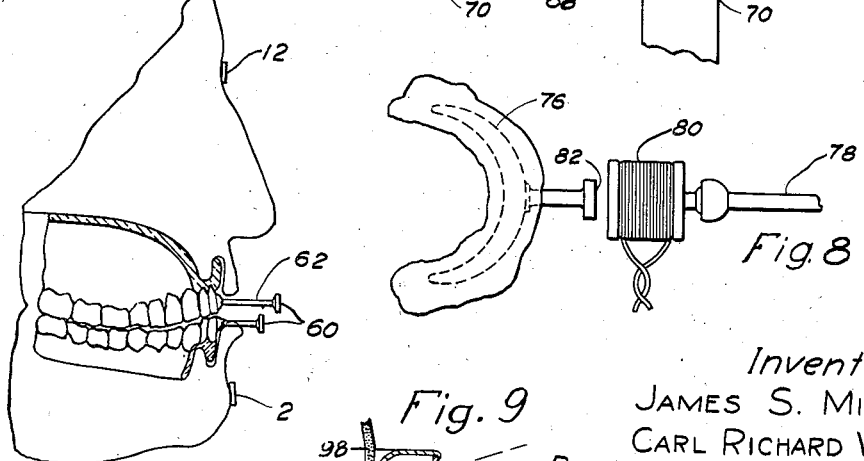
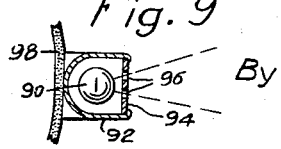
Inventors:
JAMES S. MILLER
CARL RICHARD WALLER
By Albert Sperry
Attorney Patented June 7, 1938

2,119,823

UNITED STATES PATENT OFFICE 2,119,823

METHOD AND MEANS FOR USE IN DENTISTRY

James S. Miller and Carl Richard Waller, Trenton, N. J.; said Miller assignor to Louis Friedman, Philadelphia, Pa.

Application March 3, 1934, Serial No. 713,790

26 Claims. (Cl. 32—32)

Our invention relates to methods and means for use in dentistry and particularly to methods and apparatus for accurately determining and measuring the amount and character of all movements of the lower jaw or mandible, with respect to the upper jaw or maxilla, and for determining the relative locations of the jaws, for examining and measuring movement of natural teeth in their sockets and of artificial dentures within the patient's mouth.

The joint permitting movement of the lower jaw is formed by the condyle at the rear of the jaw resting in a concavity of the temporal bone called the glenoid fossa. This joint permits the lower jaw to have different types of movement such as hinge movement (up and down), a gliding movement (forward and back), and a rotary movement (from side to side). These movements are known to the dentist as occlusion, protrusion, and right or left lateral occlusion respectively.

The shape of the condyle and of the glenoid fossa over which the condyle moves is subject to individual variations with different persons and since the movements of the mandible are influenced, or controlled by such variations it follows that these movements are frequently considerably different with different individuals. Even the right and left glenoid fossa of one individual may be different and such that on protrusion (forward gliding movement of the mandible) the mandible is inclined slightly to one side or the other, whereas in another individual similar movement of the mandible may cause no inclination at all, or may cause an inclination in the opposite direction.

In order to construct a satisfactory artificial denture which will function properly and comfortably in the mouth of the person for whom it is made, it is, therefore, important for the dentist to know as much as possible with respect to the characteristics of the movement of the patient's jaw. It is also important to know the rest position, i. e, the position in which all of the muscles of mastication are relaxed, the lips are usually in contact and the teeth of the upper and lower jaws are separated by a distance of 2 to 4 millimeters.

Attempts have been made heretofore to obtain this information by the use of instruments attached to various types of bite-plates positioned within the patient's mouth. When the individual moves the lower jaw the instruments are intended to record the movement so that the dentist can use the same in the construction of artificial dentures. However, in making registrations in this manner more or less pressure is brought to bear on the yielding tissues of the jaws and gums, with the result that they are compressed to a greater or less extent depending upon the amount of pressure applied, the nature of the tissues and other factors. For this reason it has been very difficult to obtain the registrations desired and they are frequently incorrect. Furthermore it is impossible to register the rest position of the jaw by any means which results in disturbance of the soft or hard tissues of the gums or jaws. Therefore even though the "bite" or record has been made with the greatest care and skill, it is extremely difficult to make a satisfactory denture which fits the patient comfortably and does not interfere with the natural movements of the jaw during articulation and occlusion.

An outstanding feature of our invention which avoids difficulties and inaccuracies of the prior practice resides in the use of methods and means whereby the movement or location of a patient's jaws is determined without physical contact between the jaws and the recording or indicating instruments. In this way the patient is placed under no restraint whatever so that errors unavoidably introduced in making determinations by present methods are avoided and information obtained by which the dentist can construct artificial dentures which faithfully reproduce the natural teeth of any individual.

In accordance with our invention the means by which measurements, registrations, and determinations of movements of the jaws are made preferably are entirely extra-oral, that is, located outside the mouth. Determinations with respect to the inclination and to the relative positions of the jaws can be made for each jaw independently and by mean which are partly intra-oral and partly extra-oral. When using this procedure the "bite" which has played such an important part in dentistry heretofore can be eliminated altogether.

Our invention takes advantage of the fact that the lower jaw is a unitary structure wherein one portion cannot be moved without producing a corresponding, although not necessarily similar, movement of every other part of the jaw. Thus the location and movement of the mentum or center of the chin, for example, always bears a very definite relation to the location and movement of the condyles as they pivot or move about over the glenoid fossa. Therefore by accurately determining the location of a single small point or surface on the lower jaw when moved from one position to another, a definite and equally accurate indication is obtained as to the movement of the entire lower jaw. Having determined the positions of the jaw when in rest, occlusion, right and left lateral occlusion and protrusion, the dentist not only obtains a clear picture of the shape of the condyles and glenoid fossa but he can reproduce these positions and the movements of the patient's jaw in an articulator.

The reproduction of movements of the jaw in an articulator may be made by suitable adjustments thereof to cause a corresponding point on the lower jaw of the articulator to assume the same positions as were determined upon movement of the patient's jaw.

The methods and means employed for making the desired determinations may, of course, be varied considerably but in practice we have found an optical system to give very satisfactory and accurate results when used either for recording or for reproducing the movements of the jaw. This type of system also lends itself particularly well for use in making other measurements and determinations in practicing the process involving our invention. For example, it is of great importance that the dentist position models of the patient's jaws in the articulator in exactly the same position and with the same inclinations as those of the natural jaws so that the teeth will engage in a natural and normal manner. The relative positions of base plates having impressions of the gums formed therein with respect to the jaws can be determined with the greatest accuracy by optical means and these base plates can be used in locating models in the articulator. The desired information for locating the models may be obtained for each jaw independently of the other so that the 'bite" is eliminated. However it may be of advantage in some cases to use a "bite" for determining the positions of the jaws.

When artificial dentures are produced by either the present or any other method it is always necessary to determine whether the occlusion and articulation are perfect so that the denture will fit the patient comfortably and the teeth will engage correctly in all positions of the jaw. In accordance with the present invention the amount and character of any movements of the dentures within the patient's mouth can be determined definitely so that tilting or cusp interference can be corrected if necessary with very little trouble. In like manner characteristic movements of the natural teeth in their sockets and with respect to the jaws can be determined for diagnostic purposes, if desired.

Although we ordinarily prefer the use of an optical system for making the desired measurements and determinations, our invention also contemplates and includes mechanical means for accomplishing the same or a similar result. Such mechanical means may be used by themselves or in conjunction with optical means so that the measurements and operations may be made wholly by the use of optical means or wholly by the use of mechanical means or they may be made in part by the use of one type of means and partly by the other, as desired.

One of the objects of our invention is to produce artificial dentures which accurately and faithfully correspond to the patient's natural teeth in all positions and movements of the jaws occurring in normal articulation and occlusion.

Another object of our invention is to obtain an accurate record of movement of a patient's jaw without subjecting the tissues of the jaw to pressure.

Another object of our invention is to provide means free from physical contact with the patient's jaws for determining movement or location of the jaws.

A further object of our invention is to provide extraoral means for determining characteristics of movement of a patient's jaw.

A further object of our invention is to accurately determine the rest position of a patient's jaws.

Another object of our invention is to produce artificial dentures without resorting to the formation of the usual "bite".

Another object of our invention is to utilize an optical system in the recording of movements of the jaw.

A further object of our invention is to provide apparatus for moving a beam of light in response to movements of a patient's jaw for the purpose of recording or reproducing such movements.

Another object of our invention is to provide mechanical means for making any one or all of the determinations or for performing any of the operations of an optical system embodying our invention.

Another object of our invention is to obtain definite and accurate information with respect to the movement of artificial dentures or of the natural teeth within a patient's mouth.

These and other objects and features of our invention will appear from the following description thereof in which reference is made to the figures of the accompanying drawings illustrating preferred methods of procedure and illustrative types of apparatus adapted for use in the practice of the invention.

In the drawings:

Fig. 1 is a diagrammatic illustration of a preferred form of apparatus employing an optical system for making the measurements in accordance with our invention;

Fig. 2 illustrates a typical form of record obtained by the use of the apparatus illustrated in Fig. 1;

Fig. 3 illustrates an apparatus determining the relation of the patient's gum to the jaw in accordance with our invention;

Fig. 4 illustrates the type of record produced by the use of the device shown in Fig. 3;

Fig. 5 illustrates one form of mechanism adapted for use in reproducing movements and positions of the patient's teeth and jaws in accordance with our invention;

Fig. 6 illustrates one form of means for determining movement of a denture or natural teeth in accordance with our invention;

Fig. 7 illustrates a typical form of mechanical device for making the desired measurements;

Fig. 8 illustrates mechanical means for locating models in an articulator; and

Fig. 9 is a horizontal sectional view of an alternative means for projecting a beam of light onto a screen with parts thereof shown in elevation.

In that form of our invention chosen for the purpose of illustration in Figs. 1 to 6 of the drawings an optical system is employed for making the desired record of the jaw movements and for the reproduction of these movements in an articulator; whereas in Figs. 7 and 8 a mechanical system is used for this purpose. While for many purposes the optical system is to be preferred it not infrequently happens that the mechanical system is desirable for making any one or all of the desired determinations or for performing one or more of the operations. For this reason it will be understood that the various steps of the process may be carried out with either type of means or method of procedure and they may be interchangeably used, part of the operations or determinations being made optically and part mechanically.

Referring to Figs. 1 to 6 of the drawings, a small mirror 2 is placed on the patient's lower jaw preferably on the mentum in the center of the chin, in such position that movement of the muscles of the jaw and face during articulation will not cause the tissue supporting the mirror to be moved. The mirror therefore remains in the same position with respect to the patient's jaw throughout the recording operation. The mirror itself is preferably small, say one eighth to one fourth inch square and may be secured to the patient's chin in any suitable manner which avoids displacement thereof during use. A very simple method is to apply the mirror to a piece of double surfaced adhesive tape and to secure the adhesive tape to the patient's chin with the mirror in the desired position. It is not essential to the invention that a single mirror 2 be used or that it be placed on the mentum since the same or similar results may be obtained by the use of two or more mirrors or by employing a mirror placed in any suitable location uninfluenced by movement of the tissue or means supporting the same.

A screen 4 upon which light from the mirror is reflected is positioned in front of the patient and may if desired be adjusted to any desired angular position by movement about a horizontal axis on the support 6, the position during any recording period being fixed by means of a graduated slide 7 engaged by a wing nut 8 or other suitable fastening means. A source of light 10 for producing a reflection on the screen is preferably located in fixed position with respect to the screen so as to direct a beam of light onto the mirror 2 at an angle which will cause a reflected beam of light to be moved over the screen. The position of the light source may be adjusted as desired to obtain convenient location of reflections on the screen but the position of the light should not vary between successive recording steps. While we have referred to the use of a mirror for moving a reflected beam of light over the screen it will of course be apparent that the source of light itself may be located on the patient's chin if desired. Such a construction is illustrated in Fig. 9 wherein a source of light 90 is located within a housing 92 having a member 94 extending across the front of the housing and provided with apertures 96 through which beams of light may pass to fall upon the screen 4 in predetermined positions. Suitable means such as adhesive tape 98 serve to position the light-beam producing means with respect to a patient's lower jaw. However, the use of a mirror in this location has the advantage of being light and easily applied and removed. Furthermore, the movement of a reflected beam of light over the screen is twice as great as would be the movement obtained by like displacement of the source of light itself. Thus the use of a mirror renders the device extremely sensitive to movements of the jaw and insures obtaining faithful and accurate records.

In order to prevent movement of the patient's head from influencing the record obtained it is important to know the exact relation of the lower jaw or mandible with respect to the upper jaw or maxilla at the time when each record is made. This is accomplished without inconvenience to the patient by the use of a second mirror 12, suitably located on the patient's head or other means remaining in fixed position with respect to the maxilla. As shown, the mirror 12 is positioned at the meeting of the nose with the forehead (redix nasi). Light from the source 14 or from the source 10, is then projected onto the mirror 12 from which it is reflected onto the screen 4, as shown at 16.

In utilizing the apparatus for making the desired measurements the patient is seated comfortably in a chair and the mirrors 2 and 12 are applied to the center of the chin and to the redix nasi respectively. The lights 10 and 14 (if two light sources are used) are focused on the mirrors by adjustment of the lights if necessary, and the screen is fastened in the desired position. For most purposes it is desirable that the support 6 for screen 4 and its associated parts should be given a definite location and we therefore provide a ball and socket connection 17 for the support and provide two spirit levels 15 arranged at angles to each other whereby the support may be made level and located in a known position before taking any observations. Having positioned the support 6, the screen 4 and the lights 10 and 14 in known positions the device is ready for the recording step.

The position of the patient's head is first recorded by marking the location of the reflection 16 from the mirror 12 on the screen. With this point determined, the position of the reflection from the mirror on the patient's lower jaw is recorded when the mandible is in its rest position as shown at 18, care being taken to be sure the location of reflection 16 is the same as first recorded. The patient then places his jaw in various other positions such as occlusion. The location of the reflection when the jaw is in its new position is again recorded by marking on the screen as at 20, again being sure that the position of reflection 16 has not changed.

In a similar way the position of the reflection on the screen is recorded when the patient's jaw is in the positions of extreme right and left lateral occlusion and protrusion, each time being sure that the reflection 16 indicating the position of the head remains unchanged.

In recording the positions of the mirror when the patient's jaw is in the position of protrusion which, as shown, is movement toward the screen, it is desirable that the mirror 2 should move at such an angle and to a sufficient extent to cause substantial movements of the reflection over the screen. This can be effected very readily by the original adjustment of the angle of inclination of the screen 4 or by the angle of incidence of the light from source 10 onto the screen.

The record thus obtained will be somewhat similar to that illustrated in Fig. 2 but will of course vary with every individual. As shown in Fig. 2, the reflection 16 serves as a head index and if the record is made as described above is the same for all positions of the mandible. The reflection recorded at 18 establishes the position of the mandible when at rest, whereas the reflections recorded at 20, 22, 24 and 26 establish the positions of the mandible when moved to the positions of occlusion, right and left lateral occlusions and protrusion respectively. In order to aid in properly locating an articulator or reproducer with respect to the screen it is desirable to provide the screen 4 with a center line 25 and to provide the mirrors 2 and 12 with central unpolished or non reflecting lines 27. The reflections 16 and 18 therefore will have corresponding dark lines 29 thereon which can be located on the center line 25 on the screen. The screen 4, upon which the records are made, may be marked off in squares similar to graph paper as shown at 28 if desired for the purpose of establishing a numerical indication of the various positions of the mandible, although this is not essential. Normally the record is made by drawing an outline upon the screen to indicate the various positions of the reflections so that on reproducing the movements on an articulator the dentist can readily see when the reflections coincide with the record. However records may be made photographically, electrically or by any other suitable means desired.

Since the position of the mirrors 2 and 12 with respect to the source of light 10 and 14 on the screen 4 may vary considerably when applied by the dentist to different patients or at different times it is important to establish these positions very accurately so that the mirrors may be given the same positions on the articulator for purposes of reproducing the movements of the patient's jaw. This may be accomplished by any suitable means but as shown, a third source of light 30 is provided by which light is directed onto the mirror 2 from a different direction from that from source 10, so that a second reflection 32 from the mirror 2 is obtained whereby the angular relation and position of the mirror 2 with respect to the screen 6 and the two sources of light is established. In a similar way a second reflection from the mirror 12 may be obtained at 33 for fixing the position of the latter mirror. A fourth source of light 35 may be employed if desired although the source 30 may be focused to give reflections from both mirrors 2 and 12 on the screen 4 if preferred.

Having made the necessary or desired records of the positions of the reflections upon movement of the patient's jaw as shown by the record of Fig. 2, the characteristics of the patient's articulation and occlusion are established and definite and accurate information obtained without placing any restraint upon the patient or subjecting him to inconvenience. Moreover, the tissues of the jaws are not compressed or distorted by the presence of complicated instruments or mechanism and the records have been made without physical contact between the patient and the recording mechanism. The accuracy of the determinations is due largely to the fact that movements of the reflections on the screen are in fact reflections of points or planes having fixed and known positions with respect to the patient's head and mandible and are sufficiently great to be easily observed even though the movement of the condyle itself is extremely small. By consideration of the record produced the dentist thereby obtains a clear and much more accurate indication of the characteristics of the patient's condyle and glenoid fossa and the movement of the mandible than would be obtained if some material or device were introduced into the mouth.

The next step in the process is to determine accurately the position which models of the patient's gums and jaws are to assume when placed in an articulator for constructing the dentures. The positions of such models must be identical with the positions of the patient's gums and jaws in order that the teeth of the dentures may engage properly. The necessary information for locating the models in the articulator may be readily obtained by means of base plates formed by making an impression of the gums and jaws in molding material 34 carried by a fork 36 (Fig. 3). For this purpose the wax or other molding material used is pressed gently against the gums and jaws of the mandible to obtain an impression of the surfaces against which the denture for the lower jaw is to bear when in use.

The fork 36 has a handle 38 by means of which the base plate having an impression from the patient's mouth may be transferred to the articulator. Upon the fork are two small mirrors 40 located on opposite sides of the handle for the purpose of reflecting beams of light from the source 10 onto the screen. The location of the reflections 42 (Fig. 4) from the mirrors 40 with respect to the reflection 44 from the mirror 2 as indicated upon the screen establish the position of the base plate with respect to the mandible. In a similar way an impression of the gums and maxilla for the upper denture may be formed by molding wax or the like about the upper gums and jaw by means of a second base plate carried by a similar fork 36. The location of the reflections 46 from the mirrors 40 of the fork to which the upper base plate is secured are also noted on the screen together with the reflection 48 from mirror 12 on the redix nasi. In this way the position of the base plate in which there is an impression of the maxilla and its gums may be accurately determined.

The record shown in Fig. 4 illustrates the results obtained in the latter recording operations for the purpose of locating the positions of the base plates with impressions of the upper and lower jaws therein. Ordinarily the record of Fig. 4 is made upon the record sheet shown in Fig. 2 but they are here indicated separately to clarify the description. When made upon the same record sheet it will be apparent that the reflection 44 from the mirror 2 will coincide with the reflection 18 for the rest position of the mandible if desired, whereas the reflection 48 from the mirror 12 will coincide with the reflection 16 of Fig. 2.

The dentist has now obtained by means of the record of Fig. 4 all of the information which has heretofore been obtained by having the patient make a "bite" but in the present case the record indicates the location of the gums in relation to the respective jaws rather than in relation to each other. At the same time the difficulties encountered in the usual processes of establishing the relative positions of the mandible and maxilla have been dispensed with and the necessity of making a "bite" has been eliminated. However, it will be apparent that, if the dentist prefers the "bite" method of determining the relative positions of the mandible and maxilla he may employ this method and may use a fork such as the fork 36 for locating the impressions obtained and the associated models in an articulator.

In order that the teeth of the denture may have an attractive and natural appearance when the denture is placed in the mouth the "lip line" may be determined by locating a member such as the element 43 in the position of the patient's lips. This member is provided with a mirror 45 having a center line 47 marked thereon so as to give a reflection 49 upon the screen 4 by reflection of light from the source 10. The reflection shows both the lip line and the center line for setting up the teeth in the dentures. Similarly the location of the cuspids may also be indicated on the screen by adjustment of means 51 serving to form lines 53 in the reflection 49 similar to that formed by the center line 47.

The records obtained in the foregoing manner give the dentist information on each of the following points: (1) the position of the patient's head with respect to the screen when the records were produced, (2) the position of the mirror 2 with respect to the screen, (3) the position of the base plates in which have been formed impressions of the upper and lower gums with respect to the maxilla and mandible respectively, (4) the lip line, the center line of the patient's teeth, and the location of the cuspids, and (5) the position of the patient's jaw when in a rest position and when in the positions of occlusion, left lateral occlusion, right lateral occlusion and protrusion. If models of the patient's upper and lower jaws have not already been made they can be made at this time by any suitable or usual method and the patient may be excused.

In order to reproduce the movements of the patient's jaws and to correctly position the models an articulator is placed before the screen 4 in the same position as the patient's head at the time the records were made. The articulator is provided with a stationary member corresponding to the patient's head and maxilla as shown at 50 in Fig. 5 and a movable member 52 corresponding to the mandible. A mirror 54 adjustably carried by the stationary member 50 and corresponding in location with the mirror 12, is positioned so that light from the source 10 or 14 (depending upon which is used in making the record) and from source 35 directed onto mirror 54 will fall upon the records obtained for the reflections 16 and 33 on the screen respectively. In locating the articulator a center line on mirror 54 similar to the center line 27 on mirror 12 is made to coincide with the center line 25 on the screen. This position should be obtained by bringing the articulator into alignment with the screen for example by sighting through members 55 on the stationary member 50 of the articulator. When the reflections 16 and 33 are accurately placed the position of mirror 54 on the articulator is exactly the same as that of mirror 12 when the record was made. Similarly the lower member 52 is provided with a mirror 56 pivotally mounted for adjustment to cause a reflection of light from the source 10 to fall upon the points recorded for the reflection 18 corresponding to the rest position of the mandible and the second reflection 32 by means of which the position of the mirror 2 on the patient's chin is established. In this way the positions of the articulator members with respect to the screen are made to correspond exactly with the upper and lower jaws of the patient at the time the record was made.

The models of the upper and lower jaws are now placed in their corresponding impressions in the base plates carried by the forks 36. The location of each fork, and its accompanying model, is then adjusted to cause the reflection of light from the source 10 on the mirrors 40 of the fork to fall on the points indicated at 44 and 46 on the screen for the mandible and maxilla respectively. When so positioned the models are fixed to the stationary and movable members of the articulator by any suitable means. In this way the location of the models in the articulator are accurately made to correspond to the positions of the patient's gums and jaws with respect to each other without resorting to a "bite". The forks carrying the base plates may now be removed and the articulator adjusted to reproduce the movements of the patient's jaws. If the dentist has used the bite method of determining the relative positions of the jaws the fork carrying the bite, in which both the upper and lower impressions are formed, may be properly and accurately located in the articulator in the same manner by means of light reflections.

In adjusting the articulator the parts are positioned so that when the articulator jaw 52 is moved, light from the source 10 falling on the mirror 56 will cause a reflection on the screen 4 to fall upon those points recorded for the location of the patient's jaw in the positions of rest, occlusion, protrusion, etc. When the proper adjustments and movements of the articulator jaw 54 have been obtained so that the records produced from the patient's jaws are faithfully reproduced by movements of the articulator the operation is completed, the movements and locations of the upper and lower models are identical with those of the patient's jaws and therefore the teeth may be set to construct accurate dentures.

In setting up the teeth the optical system serves as a valuable check upon the dentist's work. Each tooth is positioned and if necessary reshaped until the articulator may be moved to reproduce the movements as indicated on the record. In this way the teeth are located so that when placed in the patient's mouth little or no adjustment thereof is necessary.

The foregoing description of our invention is directed to its application in the production of complete or partial artificial dentures. However, after the denture is produced by the above or any other method it may be desirable to determine the amount and character of movement of the denture within the patient's mouth when subjected to the pressure of a bite. For this purpose we may employ any suitable means such as the optical system described above, including the mirrors 2 and 12 located on the chin and redix nasi respectively. In this case, however, a mirror 60 is placed upon the denture itself or it may, if desirable, be located outside of the patient's mouth by means of a support 62 mounted on the teeth or denture and extending between the lips as shown in Fig. 6. The location of the reflections produced by light from the mirrors 2 and 12 falling upon the screen 4 is recorded. In like manner reflections from the mirror 60 on the support 62 secured to the teeth or denture are also recorded. The recording in this case takes place when the teeth are in the position of occlusion, i. e. when the teeth are in engagement but under substantially no pressure. A second observation is made and recorded when the teeth are subjected to the pressure of a bite. Further recordings may also be made when the teeth are moved to various other positions such as left and right occlusion and protrusion to determine the necessary or desirable information to indicate the amount and character of movement of the denture that takes place under the conditions of use. In this way the dentist can determine exactly wherein a faulty denture fails to correspond to the patient's gums and jaws so that he may remedy the defects and produce a denture which has only such movement as is deemed desirable in the particular case in question.

A further use and advantage of the present invention resides in its application for diagnostic purposes and particularly in determining whether a person has or is subject to traumatic occlusion, which may be a factor causing pyorrhea. If this condition is found the patient may be treated to correct or remedy the condition before pyorrhea sets in and long in advance of other methods of determining this condition. Thus the condition may be corrected and avoided before it has become so severe that it is beyond the aid of curative or preventative measures.

Similarly our invention is applicable for use in orthodontia to determine the most effective and satisfactory manner of remedying the condition of mal-occlusion of teeth.

In the foregoing method of procedure any suitable form of articulator capable of reproducing the movements of the patient's jaw may be used. Similarly other types of optical systems may be used in carrying out the invention.

As indicated above it is also possible to obtain substantially the same information and result by means of mechanical devices. This may take the form of any suitable means mounted upon and movable with the patient's jaw but located outside of the mouth and so positioned that movement of the muscles of the jaw will not displace or influence the movement of the means employed. As shown in Figs. 7 and 8 flat plates 62 and 64 or the like may be placed in the locations of the mirrors 2 and 12 used in the optical system described above. A stationary support 66 is placed in front of the patient and arms 68 carried by the support are adjusted to various positions as needed by means of slidable connections 70 or other suitable means. Each arm is provided at its end with a pivoted member 72 having a flat surface 74 movable into engagement with the plate 62 or 64 or preferably into a position closely adjacent and parallel to the plate. When used the patient is seated as before and an arm 68 moved to bring the flat surface 74 into engagement or parallelism with the plate 64, for example. The slidable connection 70 or other movable parts are fixed in position by clamps, set screws or the like, and the movable member 72 adjusted to fix the position of the plate 64. This member is then locked or clamped in position so that the position of the head is established and is left in position while making other determinations. In a similar way the location of the mandible may be determined when in its rest position or when in the positions of occlusion, protrusion, etc.

It will be apparent that the dentist may proceed with the process from this point on using optical means for determining the relative location of the jaws and impressions thereof or for making other measurements if desired. We have in practice used mechanical means such as the arm 68 and its associated elements for determining the position of the mirrors 2 and 12 in the optical system instead of using the light sources 30 and 35 and the second reflections 32 and 33 as described above even though all of the other determinations are made optically. However, when using either the optical or the mechanical systems for any part of the process it is often more convenient to use the same means throughout the operations.

When employing mechanical means for fixing the location of the upper and lower jaws impressions may be made of each jaw independently although a bite giving the impressions of both jaws may be made. For this purpose wax or molding material is applied to a fork 76 in the usual manner. The position of the fork and of the base plate carried thereby may be fixed by means of an arm 78 mounted on the support 66 and provided with securing means for holding the fork in fixed position so that models of the gums and jaws may be located correctly in the articulator. One convenient type of securing means adapted for this purpose comprises an electro-magnet 80 pivotally mounted on an arm 78 and movable into engagement with a flat surface 82 on fork 76 which in this case is formed of magnetizable material. When properly positioned the electro-magnet 80 is energized so that the base plates are held in their correct positions for transferring the base plates to the articulator. Having fixed the positions of the base plates these may be used for locating models of the gums and jaws in the articulator in the usual manner.

In reproducing movements of the lower jaw in the articulator after making the determinations mechanically the articulator is adjusted to bring flat surfaces thereon corresponding in position to the plates 62 and 64, into the correct positions accurately contacting or parallel with the surfaces 74 on members 72. When the models have been correctly positioned and the proper adjustments of the articulator made the surfaces on the articulator will accurately engage or become parallel with each of the surfaces 74 when the articulator jaw is moved from one position to another. Movements of the patient's jaw have then been reproduced and the dentist may proceed to set up the teeth.

The method just described may be carried out by the use of various forms of mechanical devices other than those described. However, in any case whether using a mechanical system or an optical system it is important to permit the patient to make free and natural movements of the mandible without compression of the gums or tissues of the jaw in order to obtain reliable and accurate results.

From the foregoing description of our invention it will be apparent that it is capable of use for various purposes and in a wide variety of forms. It will also be desirable in many instances to alter the manner of applying the principles of the invention to obtain the most effective results in each case. For this reason it should be understood that the apparatus and the methods of using the same described herein are intended for illustrative purposes only and are not intended to limit the scope of the invention.

What is claimed is:

1. Apparatus for use in dentistry having in combination a member adapted to be moved in response to movement of a patient's lower jaw, a second member adapted to be located in predetermined position with respect to a patient's upper jaw and means adapted to be located in fixed position with respect to one of said members and to indicate the position of the other of said members for establishing the relative positions of said members, said means being free from physical contact or connection with said members and located in spaced relation thereto.

2. Apparatus for use in dentistry comprising a member presenting a plane surface adapted to be moved in response to movement of the patient's lower jaw, a second member presenting a plane surface adapted to be located in a predetermined position with respect to a patient's upper jaw, and means adapted to be positioned in fixed position with respect to said second member and cooperating with the plane surfaces on said first member for establishing the relative positions of said members, said means being free from physical contact or connection with said members and located in spaced relation thereto.

3. Apparatus for use in the production of artificial dentures comprising a mirror adapted to be moved with a patient's jaw, a source of light, a screen positioned to receive a reflection of light passing from said source to said mirror, and means for determining the relative positions of said mirror and screen.

4. Apparatus for use in dentistry having in combination a member presenting a plane surface and adapted to be located in fixed position with respect to a person's lower jaw so as to be moved thereby, a second member presenting a plane surface adapted to be located in fixed position with respect to a patient's upper jaw, recording means mounted independently of said members and free from physical connection therewith cooperating with the plane surfaces on said members to give an indication of the positions thereof and a reproducer having elements thereon movable into the same positions with respect to the recording means as were the plane surfaces on said members at the time said indication was given.

5. Apparatus for use in dentistry comprising a mirror adapted to be moved with a patient's jaw, a source of light, a screen positioned to receive a reflection of light passing from said source to said mirror, means for determining the relative positions of said mirror and screen and a reproducer having a movable element provided with a mirror adapted to be located in a position with respect to said screen similar to the position of the mirror on the patient's jaw.

6. Apparatus for use in the production of artificial dentures comprising a mirror adapted to be moved with a patient's lower jaw, a source of light, a screen positioned to receive a reflection of said source of light from said mirror, means for determining the position of the patient's upper jaw with respect to the screen, means for determining the relative positions of said mirror and said screen and an articulator having a mirror thereon adjustable to reproduce the reflection of light from the mirror on the patient's jaw on said screen.

7. In a method of producing artificial dentures the steps of moving a beam of light in response to movement of the patient's jaw recording a plurality of points in the movement of said beam of light, forming models of the patient's jaws, securing one of said models to a movable member of an articulator and moving the movable member of the articulator to reproduce movements indicated by the record obtained.

8. In a method of producing artificial dentures the steps of moving a beam of light in response to movement of the patient's jaw from one position to another, recording a plurality of points in the movement of said beam of light, forming models of the patient's jaws, placing said models in an articulator, moving a beam of light in response to movements of the articulator and adjusting the articulator to cause the latter beam of light to fall upon those points indicated by the record of movement of the former beam of light.

9. In a method of producing artificial dentures the steps of placing a mirror on the patient's jaw, recording movements of the jaw by reflection of light from said mirror, forming models of the patient's jaw, placing said models in an articulator and moving one of the models with an element of the articulator as indicated by the record of those movements of the patient's jaw recorded.

10. In a method of forming artificial dentures the steps of placing a mirror on the patient's chin, placing a second mirror on the patient's head, reflecting beams of light from said mirrors onto a screen, recording the location of the reflections on the screen and repeating said operation when the patient's jaw is displaced from that position first recorded while maintaining the reflection of the beam of light from the mirror on the patient's head in the same position.

11. In a method of producing artificial dentures the steps of placing a mirror on the patient's jaw, recording the location of a reflection of the mirror on a screen when the jaw is moved to various positions without movement of the head, forming models of the upper and lower jaws, forming impressions of the gums of each jaw, recording the position of impressions of the gums with respect to the jaws, recording the position of the patient's head, locating an articulator in the position of the patient's head, placing models in the articulator in the positions indicated by the record of the impressions, moving a beam of light with the articulator and adjusting the articulator to produce reflections on said screen in the same positions as those recorded upon movement of the patient's jaw.

12. The method of producing artificial dentures which comprises the steps of placing a mirror on the patient's jaw, recording the position of a reflection of the mirror on a screen when the patient's jaw is moved to different positions, recording the position of the patient's head when the jaw is in each position, forming impressions of the patient's jaws and recording the location thereof with respect to the jaws, forming models of the patient's jaws, placing the models in an articulator in the same position with respect to the articulator jaws as the impressions were located, positioning a mirror on the articulator jaw in the same position with respect to the screen as was the mirror on the patient's jaw while the articulator is located in the same position as the patient's head at the time the record of movements of the jaw was made and adjusting the articulator to cause a reflection from the mirror on the articulator jaw on the screen to fall on the same points on the screen recorded as a result of movement of the patient's jaw.

13. The method of determining the amount and character of movement of an artificial denture within a patient's mouth as a result of a bite which comprises the steps of supporting a mirror on the denture and recording the location of a reflection of light from said mirror on a screen when the patient's jaw is in the position of occlusion but without pressure and again recording the location of a reflection of light from the mirror on the screen when the patient applies the pressure of a bite to the denture and while maintaining the patient's head in the same position.

14. The method of determining the amount and character of movement of a person's natural teeth in their sockets which comprises the steps of supporting a mirror on the person's teeth and recording the location of a reflection of light from the mirror on the screen when the teeth are in the occlusion position and both with and without the application of the pressure of a bite.

15. Apparatus for determining the position or characteristics of a person's lower jaw with respect to their upper jaw or for locating the position of a base plate having an impression of a surface to be engaged by a denture with respect to the jaw by which the base plate is carried comprising an element carried by that member the position of which is to be determined, an optical system having a source of light and a screen so positioned that light from said source falls first on said element and thereafter falls on said screen and means for establishing the position of said light and screen with respect to the upper jaw or the jaw by which the base plate is carried.

16. Apparatus for use in dentistry having in combination a mirror adapted to be located in fixed position with respect to a person's lower jaw, a source of light and a screen positioned to receive a reflection of light passing from said source to said mirror and means for determining the position of said light and screen with respect to the patient's upper jaw.

17. Apparatus for determining the position or characteristics of a patient's jaw or for locating the position of a base plate having an impression of a surface to be engaged by a denture, said apparatus comprising two elements one of which is adapted to be located in fixed position with respect to one of the patient's jaws and the other of which is adapted to be located in fixed position with either the other jaw or said base plate, means for projecting light onto said elements and a screen so positioned with respect to said means and elements that light from said means falls first on said elements and then on said screen.

18. Apparatus for use in dentistry comprising a mirror adapted to be located in fixed position with respect to a patient's mandible, a second mirror adapted to be located in fixed position with respect to the patient's maxilla, means for projecting light onto said mirrors and a screen positioned to receive light reflected from said mirrors.

19. Apparatus for use in dentistry comprising two spaced sources of light, a screen, means for establishing the position of the lights and screen with respect to the patient's upper jaw and a member adapted to be located in fixed position with respect to a patient's lower jaw, said member being so positioned that light from each of said sources falls on said member and thereafter falls on said screen.

20. Apparatus for use in dentistry comprising two spaced sources of light, a screen, a mirror adapted to be located in fixed position with respect to the patient's maxilla, and a second mirror adapted to be moved in response to movement of the patient's mandible, said sources of light and screen being so positioned with respect to said mirrors that light from one of said sources falls upon one of said mirrors and is reflected onto said screen and light from the other source falls on the other mirror and is reflected onto said screen.

21. A method for determining the position or character of movement of a patient's jaw or for determining the position of a base plate having therein an impression of a surface to be engaged by a denture, said method including the steps of placing a mirror in fixed position with respect to one of the patient's jaws, placing a second mirror in fixed position with respect to either the other jaw or said base plate, projecting light onto said mirrors and recording on a screen the positions of reflections of light from said mirrors.

22. Apparatus for use in dentistry comprising a mirror adapted to be moved with a patient's lower jaw, a source of light, a screen positioned to receive a reflection of light passing from said source to said mirror and means for determining the position of said screen with respect to a patient's upper jaw.

23. A method of reproducing the location or movement of a person's lower jaw with respect to their upper jaw comprising the steps of projecting beams of light onto a screen to indicate the location of each jaw, projecting beams of light from fixed and movable members of a reproducer onto the screen to indicate the positions of said members and moving the fixed and movable members to cause the beams of light therefrom to fall on those areas of the screen indicating the location of the person's upper and lower jaws respectively.

24. Apparatus for use in dentistry comprising a source of light, a screen, means adapted to be moved by a patient's lower jaw serving to project light from said source in a beam onto said screen and means for determining the position of said screen with respect to a patient's upper jaw.

25. Apparatus for use in dentistry comprising a screen, means adapted to be moved by a patient's lower jaw serving to project light in the form of a beam onto said screen, and means for determining the position of said screen with respect to a patient's upper jaw.

26. Apparatus for use in dentistry comprising a screen, a source of light adapted to be carried by and moved with a patient's lower jaw and serving to project light in the form of a beam directly onto said screen, and means for determining the position of said screen with respect to a patient's upper jaw.

JAMES S. MILLER.
CARL RICHARD WALLER.